E. C. WILLS.
CLUTCH MECHANISM.
APPLICATION FILED MAY 12, 1913.
1,082,381.
Patented Dec. 23, 1913.
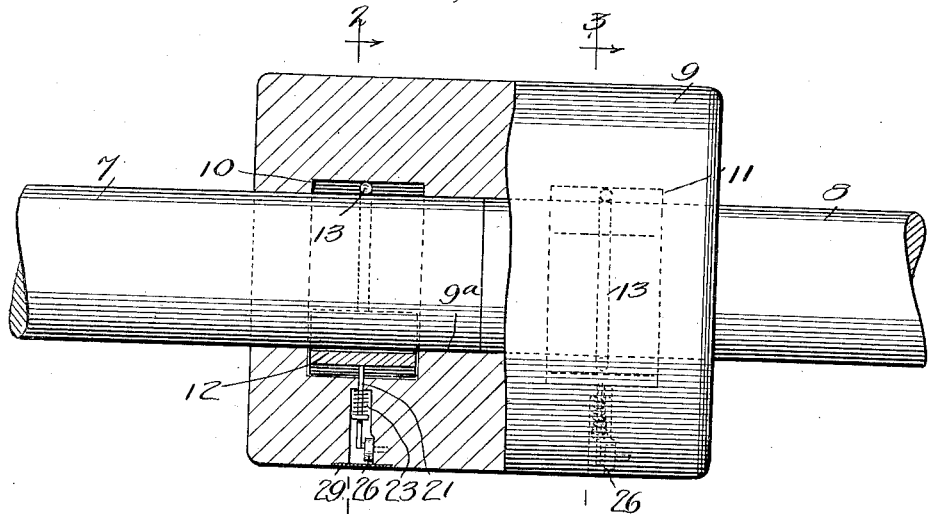
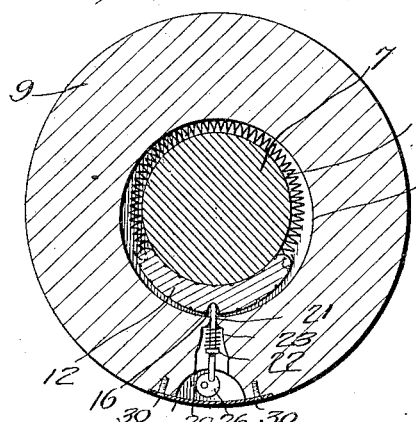
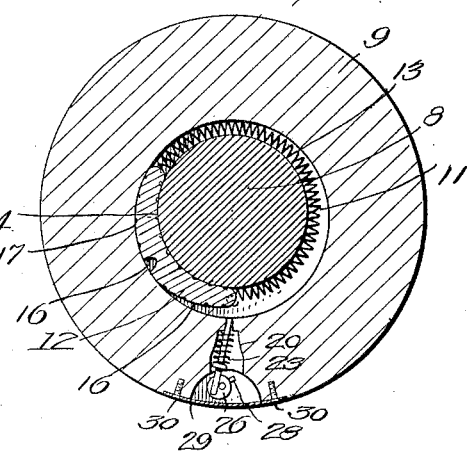
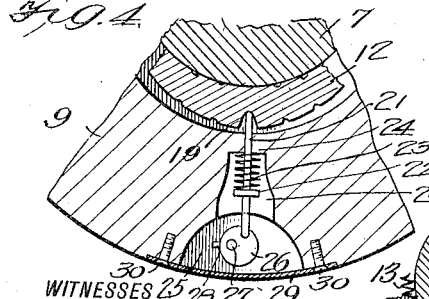
WITNESSES
H. C. Barry
Walton Harrison
INVENTOR
Edwin C. Wills
BY Munn & Co.
ATTORNEYS

UNITED STATES PATENT OFFICE.

EDWIN COOPER WILLS, OF FREDERICK, MARYLAND.

CLUTCH MECHANISM.

1,082,381.  Specification of Letters Patent.  Patented Dec. 23, 1913.

Application filed May 12, 1913. Serial No. 767,014.

*To all whom it may concern:*

Be it known that I, EDWIN COOPER WILLS, a citizen of the United States, and a resident of Frederick, in the county of Frederick and State of Maryland, of the United States of America, have made a new and useful Improvement in Clutch Mechanisms, of which the following is a specification.

My invention relates to clutch mechanisms adapted for general use and more particularly to clutch mechanism used in connection with shafting for the purpose of connecting shaft sections together and then disconnecting them under such conditions that when connected they will have no slipping movement relatively to each other.

My invention further relates to means for rendering the shaft coupling comparatively strong as well as simple in construction and reliable in its action when moving out of or into operative position.

In the drawings Figure 1 is a side view partly in elevation and partly in section showing my invention as employed in connection with two butting shaft sections, Fig. 2 is a cross section on the line 2—2 of Fig. 1 looking in the direction of the arrow, Fig. 3 is a cross section on the line 3—3 of Fig. 1 looking in the direction of the arrow, Fig. 4 is a detail showing in enlarged section the parts appearing in the lower portion of Fig. 2, Fig. 5 is a detail showing in perspective the shoe forming a part of my improved clutch mechanism, and Fig. 6 is a detail showing in section a different form of shoe, which may, if desired, be employed.

Revoluble shaft sections 7 and 8 are placed in alinement, that is their ends are abutted loosely together. Encircling the adjacent ends of these shaft sections is a sleeve 9 made of metal and preferably having a rather massive form. This sleeve is provided with a substantially cylindrical bore 9ª extending axially through it. The sleeve 9 is further provided with two compartments 10—11, each having a general circular form and being eccentric relatively to the bore 9ª, and of greater diameter than the latter. Mounted in each compartment 10—11 is a shoe 12 having a general form indicated in Fig. 5. A spiral spring 13 is connected with the ends of this shoe and extends around the adjacent shaft 7 or 8 for the purpose of drawing the shoe with a gentle tension against the adjacent surface of the shaft. The shoe 12 is provided with an inner concave surface 14 and with a number of grooves 15 crossing this face. The shoe is also provided with two outer faces 16—17, each of these outer faces being crossed by grooves 18, the faces being separated by a comparatively large groove 19. The faces 16—17 have the same curvature as the adjacent peripheral boundary surface of the compartments 10 or 11 in which the shaft is housed. The faces 16—17 are thus each struck upon the arc of a circle; the curve of the face 16, however, is struck from a different center than that of the face 17, the net result being that the groove 19 separates two faces, either of which may fit neatly against the adjacent peripheral surface of the compartment 10 or 11 but both of the faces cannot fit against the surface in question at the same time. For instance, according to Fig. 3 the face 17 is fitted neatly against the adjacent peripheral surface of the compartment 11 but the face 16 is not in similar engagement.

The sleeve 9 is provided with a recess 20 having substantially a funnel shape. A locking pin 21 extends through this recess into the adjacent compartment 10 or 11. The locking pin 21 carries an annular disk 22 and engaging the latter is a spring 23, this spring also engaging a portion 24 of the adjacent boundary surface of the recess 20. The recess 20 merges into a larger recess 25. Housed within the recess 25 is an eccentric 26, which is journaled upon a pin 27, the latter being carried by the sleeve 9. The eccentric 26 is further provided with a handle 28, whereby it may be turned. A cover plate 29 having a general arcuate form is fitted over the recess 25 and sunken slightly in relation to the outer curved surface of the sleeve 9. The cover plate 29 is held in position by screws 30 and may be easily removed by first removing these screws.

To facilitate the connection of the spring 13 with the shoe, I provide the shoe at its ends with holes 19ª of arcuate form, one of such holes being shown at the left of Fig. 5. In the form shown in Fig. 6, I employ a shoe 31 provided with a convex outer face 32 and a concave inner face 33, this shoe being mounted in a compartment 34 of substantially eccentric shape in a sleeve which is shown at 35. In this form of my device, I discard the locking pin 21 and various parts immediately associated therewith.

The operation of my device is as follows: The parts being assembled and arranged as described, the sleeve 9 is first locked to one of the shaft sections, say the one numbered 8. To do this all that is necessary is to turn the eccentric 26 into the position indicated in Fig. 3 and rotate either of the two shaft sections 7—8. The rotation of the shaft by tending to displace the shoe 12 relatively to the sleeve 9, locks the shoe 12 so that one or the other of its faces 16—17 is caused to bear firmly against the adjacent circular eccentric surface bounding the compartment 11, and the shoe is thus wedged in between the shaft section 8 and the adjacent portion of the pheripheral boundary of the compartment 11. This being done, practically the entire face 17 is in clutching engagement and the entire face 14 is also in bearing or clutching engagement.

In order to disengage the sleeve 9 from the shaft 8, all that is necessary is to turn either of these parts in a direction contrary to that in which the same part was actually or constructively turned in order to lock them together. If now after being thus unlocked the rotary movement be carried still further the sleeve 9 is again locked upon the shaft 8.

In practice I often find it convenient to allow one of the shoes 12 to remain permanently in contact with the shaft section—say the one numbered 8, and to lock and unlock the other shaft section. This, however, is not strictly necessary.

By turning the eccentric 26 into the position indicated in Fig. 4, and then turning the sleeve 9 slightly in a proper direction relatively to the shaft 8, the lock pin 24 may be caused to lodge in the groove 19. This being done, any further relative rotary movement between the sleeve 9 or the shaft 7 is unable to cause the shoe 12 to grip the shaft 7, and the result is that the shafts 7 and 8 are now disengaged from each other and will so remain for any length of time until the eccentric 26 is again turned. In order, therefore, to render the clutch mechanism idle, all that is necessary is to remove the cover plate 29 and turn the eccentric 26 into the position indicated in Fig. 3. Where the form shown in Fig. 6 is used the shoe 31 will always grip the shaft no matter what may be the direction of rotation.

I do not limit myself to the precise construction shown, the scope of my invention being commensurate with the claims.

I claim:

1. A clutch mechanism comprising a substantially cylindrical shaft section, a sleeve carried by said shaft section and provided with a substantially cylindrical bore mating said shaft section, said sleeve being further provided with a compartment merging into said bore and eccentric relatively to the same, a shoe arranged loosely within said compartment and provided with a concave inner bearing surface for engaging an adjacent shaft section, said shoe being further provided with a pair of convex bearing surfaces, the curvature thereof being struck from different centers so that only one of said bearing surfaces can by direct rotation be brought into perfect gripping engagement with the adjacent surface of the said sleeves of said compartment bounding said sleeve.

2. In a clutch mechanism, the combination of a shaft section, a sleeve loosely mounted thereon and revoluble relatively thereon, said sleeve being provided with a compartment encircling said shaft section and eccentric relatively to the same, a shoe mounted loosely within said compartment and provided with a groove, a locking pin carried by said sleeve and extending into said compartment for the purpose of entering said groove, and means controllable at the will of the operator when the sleeve is at rest for shifting said locking pin into different positions in order to enable it to enter and leave said groove.

3. A clutch mechanism comprising a shaft section, a sleeve encircling the same and provided with a cylindrical compartment, said compartment encircling said shaft eccentrically with respect to the same, a shoe mounted loosely within said compartment for the purpose of engaging said shaft and the adjacent surfaces of said sleeve bounding said compartment, and a spring connected with said shoe and together therewith extending around said shaft for the purpose of holding said shoe gently against said shaft.

4. A clutch mechanism comprising a revoluble shaft, a sleeve fitted over said shaft and provided with a cylindrical compartment, eccentric with respect to the shaft, a shoe mounted loosely within said compartment, a spring connected with the ends of said shaft for the purpose of drawing said shoe against said shaft, and means controllable at the will of the operator when the sleeve is at rest for holding said shoe in a predetermined position in order to prevent said shoe from locking said sleeve and said shaft together.

EDWIN COOPER WILLS.

Witnesses:
G. W. KINDLEY,
J. C. DIFFENDAL.

---

Copies of this patent may be obtained for five cents each, by addressing the "Commissioner of Patents, Washington, D. C."